United States Patent [19]
Diep

[11] Patent Number: 6,097,156
[45] Date of Patent: Aug. 1, 2000

[54] SWITCHING CONTROL SYSTEM FOR AUTOMATICALLY TURNING HEADLIGHTS OFF AND ON AT INTERSECTIONS

[76] Inventor: Michael T. Diep, 1075 Bellevue Way NE., Bellevue, Wash. 98004

[21] Appl. No.: 09/256,501

[22] Filed: Feb. 22, 1999

[51] Int. Cl.$^7$ ........................................ B60Q 1/02
[52] U.S. Cl. .............................. 315/82; 307/10.8
[58] Field of Search ................... 315/82, 77, 78, 315/79, 80; 307/10.8, 10.6, 9.1, 10.1

[56] References Cited

U.S. PATENT DOCUMENTS

| | | | |
|---|---|---|---|
| 3,914,739 | 10/1975 | Caughlin et al. | 340/72 |
| 4,127,793 | 11/1978 | Kojima | 315/80 |
| 4,684,177 | 8/1987 | Ha | 303/100 |
| 4,940,962 | 7/1990 | Sarokin | 340/479 |
| 5,519,256 | 5/1996 | Goodridge | 307/10.8 |
| 5,767,589 | 6/1998 | Lake et al. | 307/10.8 |
| 5,796,094 | 8/1998 | Schofield et al. | 250/208.1 |
| 5,877,680 | 3/1999 | Okuchi et al. | 340/468 |

*Primary Examiner*—Don Wong
*Assistant Examiner*—Tuyet T. Vo
*Attorney, Agent, or Firm*—Robert W. Jenny

[57] ABSTRACT

The switching control system turns off the headlights of a vehicle when the vehicle'S brakes are applied and the vehicle is slowing down and possibly stopping at an intersection and turns the headlights on when the brakes are released. An auxiliary headlight switch turns the headlights on and off by processing signals from (1) the conductor which lights the brake lights and (2) an electrical signal from the speed indication system of the vehicle. The headlights are turned off when (1) the brakes are applied, sending power to the brake lights and (2) vehicle speed is below a designated level, as indicated by a unit which receives the speed signal and generates a signal when the speed is below the designated level. An indicator light is lit when the subject control switching is in effect. In an original equipment embodiment the control switching is powered by the fourth position on a 4 position headlight switch. In a retrofit embodiment, a separate switch enables the subject control switching and disables the conventional headlight circuit while the subject equipment is in use.

8 Claims, 1 Drawing Sheet

SWITCHING CONTROL SYSTEM FOR AUTOMATICALLY TURNING HEADLIGHTS OFF AND ON AT INTERSECTIONS

BACKGROUND OF THE INVENTION

1. Field

The subject invention is in the field of switching which controls electric lights to turn them on and off and/or adjust their brightness. In particular it is in the field of switching control for electric lights used in automobiles and trucks.

2. Prior Art

It is recognized that there is much prior art in this particular field, patented and not. In some vehicles the headlights and parking lights are controlled by a switch having a knob which is pushed and pulled and by a lever controlled switch on the steering column. Pulling the push-pull switch out to a first stop lights the parking lights. Pulling it to a second stop keeps the parking lights lit and lights the headlights with their beams directed in the so-termed "low beam" mode. The lever is used to switch the headlights to the high beam mode and back to the low beam mode. In other vehicles the control switch for the parking lights and headlights is a knob, turnable on the end of the lever. It is well recognized that it is a courteous and a safe practice when driving with headlights in the high beam mode, to switch them to the low beam mode when approaching oncoming vehicles. There is increasing recognition, in Japan for example, that it is also courteous and in the interest of safety to turn off the headlights of vehicles when approaching and stopping at intersections to greatly diminish the interference with the vision of drivers and occupants of vehicles approaching the intersection from the oncoming direction and stopping. Once the lights are off, however, it is highly important that they be turned on again as the vehicles cross the intersection. Experience has shown that turning the lights on again is quite often neglected until the need for the illumination is recognized and often urgent. Manually turning the lights on and off is inconvenient and neglecting to turn them on again is definitely unsafe, involving more risk than leaving them on at the intersection. Accordingly, the prime objective of the subject invention is to provide a switching control system which automatically turns off a vehicle's headlights as it slows down and stops at an intersection. A second objective is that the switching control system also automatically turns the headlights on again as the vehicle starts and gains speed. Another objective is that the switching control be simple and economical to implement as original equipment and as retrofit equipment.

SUMMARY OF THE INVENTION

The subject invention is a switching control system for vehicle headlights such that with the vehicle light switch set to light the headlights the headlights are automatically turned off as the vehicle slows down and stops at an intersection and automatically turned on when the vehicle begins to move again. In embodiments of the invention in which it is installed as original equipment the headlights and parking light control switch is a four position switch, replacing the conventional three position switch. In position 1 the lights are off. In position 2 the parking lights are on. In position 3 the parking lights and headlights are on. Separate switching independent of the subject switching, adjusts the headlights to high beam and low beam modes. Position 4 duplicates position 3 in basic function but the power to the headlights is influenced by sensors and switches which sense the deceleration and stopping of the vehicle and turn the headlights off and then sense that the vehicle is starting and accelerating and turn the lights on. One sensor is the braking sensor which senses power being applied to the brake lights and generates a braking signal. Another is the vehicle speed sensor which provides a signal proportional to vehicle speed. The vehicle speed signal may be taken from the vehicle speedometer circuitry and processed by the subject system for system purposes. Alternately, an independent vehicle speed signal generator may be used. The speed signal is applied to circuitry which generates a low speed signal when vehicle speed is below a designated threshold, such as 3 miles per hour. When both the braking signal and low speed signal are applied to an auxiliary headlight switch control, the headlights are turned off. When either signal is removed from the auxiliary control the lights are turned on. The results are that when the vehicle is braked and slows to below the designated speed the headlights are turned off. When the brakes are released the headlights are turned on again. The designated speed is adjustable.

It is recognized that braking and slowing to below the designated speed can occur on occasions when it would not be desirable for the headlights to be extinguished. To help avoid this a blinking light on the dashboard of the vehicle continually reminds the driver that the subject control switching is in effect and should be turned off by moving the light switch to position 3 when intersections are not being or to be encountered.

The invention is described in more detail below with reference to the attached drawings.

DETAILED DESCRIPTION OF THE INVENTION

The subject invention is a switching control system for vehicle headlights such that with the vehicle light switch set to light the headlights the headlights are automatically turned off as the vehicle slows down and stops at an intersection and automatically turned on when the vehicle begins to move again.

Figure 1:
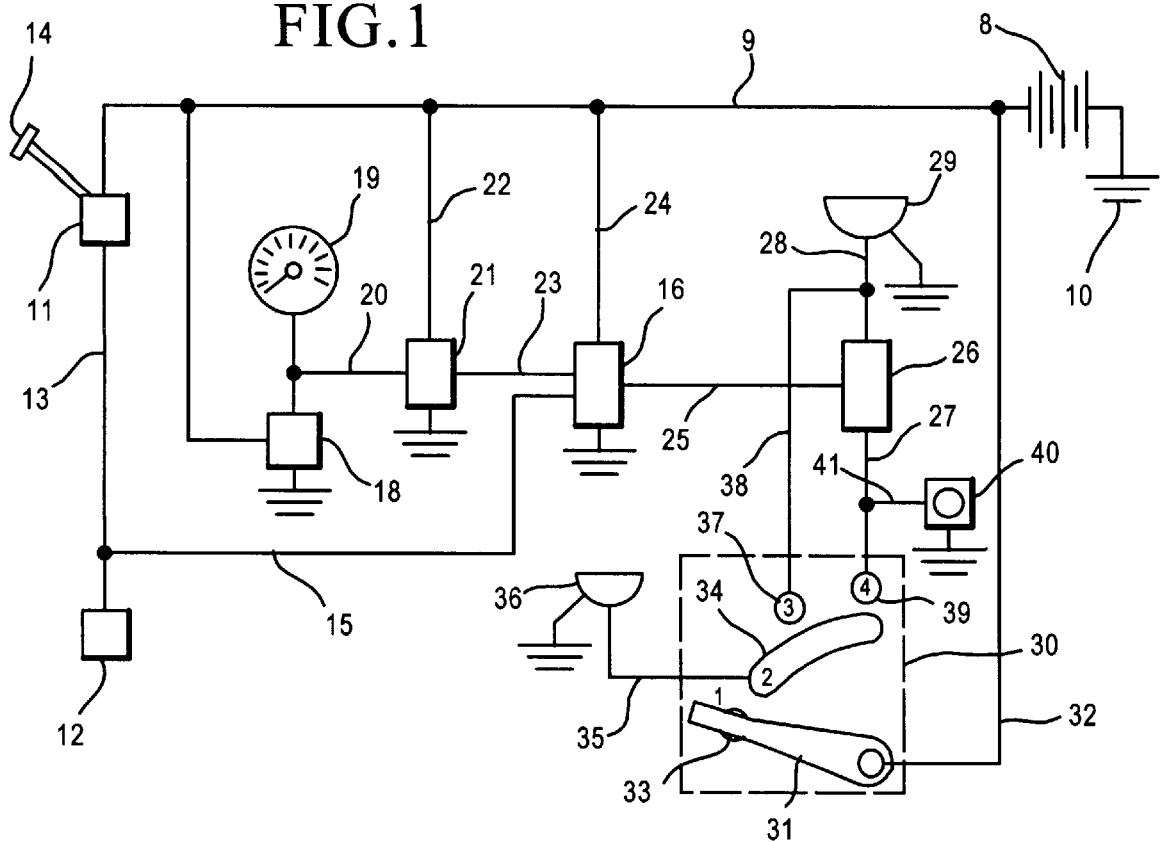
FIG. 1 is a block diagram illustrating an original equipment embodiment of the subject switching control system.

FIG. 1 is a block diagram illustrating an original equipment installation of the embodiment of the subject switching control system. Electrical power for all the components is provided by battery 8, connected to busbar 9 and ground 10. Brake light switch 11 provides brake light power to the brake light 12 via conductor 13 when brake pedal 14 is pushed. Conductor 15 conducts brake light power to auxiliary headlight signal generator 16. Conductor 17 conducts power to unit 18 which generates the signal which activates the vehicle speedometer 19. Conductor 20 conducts that signal to speed signal generator 21 which receives power via conductor 22. The speed signal generator incorporates a threshold circuitry which blocks the transmission of power delivered by conductor 20 to conductor 23 unless the signal to the speedometer is signaling equal to or less than a designated speed, such as 3 miles per hour. The auxiliary headlight signal generator receives power via conductor 24 and is designed such that when it receives signals via both conductor 15 and conductor 23 it generates a signal to conductor 25 which conducts the signal to auxiliary headlight switch 26 and causes it to interrupt power flowing through it from conductor 27 to conductor 28 to light headlight 29. Power reaches conductor 27 via headlight switch 30, schematically diagrammed. Power reaches arm 31 of switch 30 via conductor 32. Switch 30 manually operated is a manually operated 4 position switch and is shown in position (1), the off position since no units are connected to terminal 33. When the switch is turned to position (2) so that arm 31 contacts terminal 34, power is conducted via conductor 35 to parking light 36. When the switch is turned to position (3), arm 31 conducts power to terminal 34 and terminal 37 and power is delivered via conductor 38 to conductor 28 and thereby to light 29. When the switch is turned to position (4), arm 31 conducts power to terminals 34 and 39, delivering power to conductor 27 which, when allowed transmission through auxiliary headlight switch 26, lights light 29. When switch 26 is receiving a signal via conductor 25 it does not allow transmission of power to light 29. When there is no signal via either conductor 16 or 23, there will be a signal via conductor 25 and light 29 will be lit. When arm 31 is in position 4 power is delivered to blinking light 40 via conductor 41 to signify that arm 31 is in position 4.

All units receiving power from busbar 11 are grounded to complete the circuits with battery 10.

Figure 2:
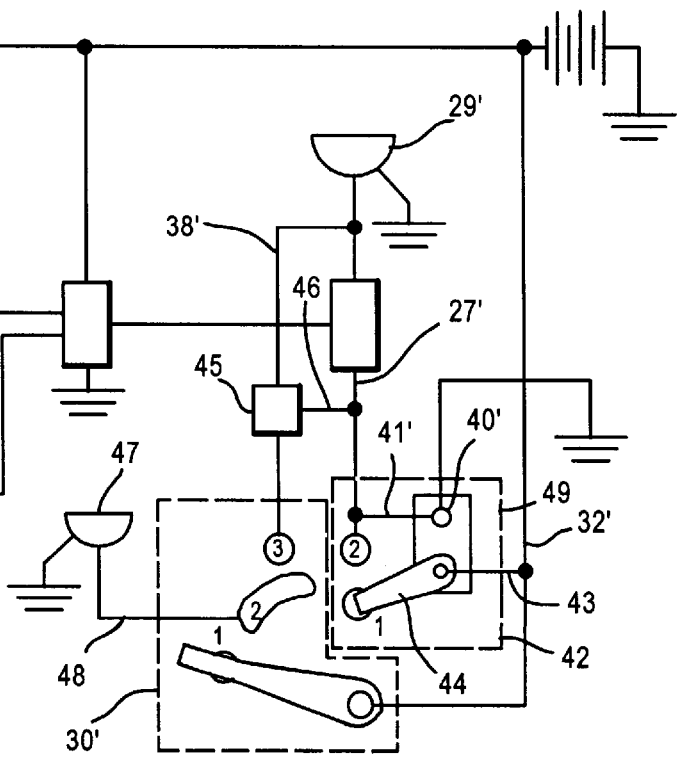
FIG. 2 illustrates a retrofit embodiment of the subject switching control system.

FIG. 2 illustrates a retrofit embodiment of the subject control switching. This embodiment is the same as that of FIG. 1 except that light switch 30' is three position (conventional) and the function of position 4 in switch 30 is performed by manually operated 2 position switch 42. Switch 42 receives power from conductor 32' via conductor 43. When arm 44 of switch 42 is in its position (1), no power is transmitted. When arm 44 is in position (2) of switch 42 power is conducted to conductor 27' and the switching proceeds as described for the embodiment shown in FIG. 1 except that power through conductor 38' must be interrupted. This is done by switch 45, receiving power from conductor 27' via conductor 46. When power is delivered to unit 26' via conductor 27' switch 45 interrupts power through conductor 38'.

Signal light 47 is integrated with switch 30' and receives power via conductor 48 when switch 30' is in position 2. Blinking light 40' is mounted in case 49 of switch 42 and is powered by conductor 41'.

It is considered to be understandable from this description that the subject invention meets its objectives. It provides switching control which automatically turns off a vehicle's headlights as it slows down and stops at an intersection and automatically turns them on again when the vehicle starts and gains speed. The control switching is simple and economical to implement as original equipment and as retrofit equipment.

It is also considered to be understood that while certain embodiments of the subject invention are described herein, other embodiments and modifications of those described are possible within the scope of the invention which is limited only by the attached claims.

I claim:

1. In a vehicle having headlights, brakes and the capability to operate in a range of speed, a switching control system comprising means for turning off said headlights when said speed is below a designated speed and said brakes are applied and for turning said lights on when said brakes are released.

2. The switching control system of claim 1 further comprising a light which indicates that said system is in use.

3. The switching control system of claim 1 in which said designated speed is adjustable.

4. The switching control system of claim 3 further comprising a light which indicates that said system is in use.

5. A switching control system for use in a vehicle having headlights, brakes and an indicator indicating speed, said system comprising:

means for providing a first electrical signal when said speed is below a designated speed, means for generating a second electrical signal when said brakes are in use, and means for turning said headlights on and off and for turning said headlights off when said first and second signals are applied to said means for turning said headlights on and off and turning said headlights on when at least one of said first and second signals is not applied to said means for turning said headlights on and off.

6. The switching control system of claim 5 further comprising a light which indicates that said system is in use.

7. The switching control system of claim 5 in which said designated speed is adjustable.

8. The switching control system of claim 7 further comprising a light which indicates that said system is in use.

\* \* \* \* \*